(12) United States Patent
Nott

(10) Patent No.: US 11,915,040 B2
(45) Date of Patent: Feb. 27, 2024

(54) SCHEDULING AND PRIORITIZING RPA JOBS BASED ON USER-DEFINED PRIORITY

(71) Applicant: UIPath, Inc., New York, NY (US)

(72) Inventor: Brandon Nott, Bellevue, WA (US)

(73) Assignee: UIPATH, INC., New York, NY (US)

( * ) Notice: Subject to any disclaimer, the term of this patent is extended or adjusted under 35 U.S.C. 154(b) by 330 days.

(21) Appl. No.: 16/821,394

(22) Filed: Mar. 17, 2020

(65) Prior Publication Data

US 2021/0294644 A1 Sep. 23, 2021

(51) Int. Cl.
G06F 9/48 (2006.01)
B25J 9/16 (2006.01)
G06F 9/54 (2006.01)

(52) U.S. Cl.
CPC ............ *G06F 9/4881* (2013.01); *B25J 9/163* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 9,817,967 B1 | 11/2017 | Shukla et al. | |
| 10,318,346 B1* | 6/2019 | Harizopoulos | G06F 3/061 |
| 10,623,233 B1* | 4/2020 | McConnell | H04L 41/046 |
| 10,908,950 B1* | 2/2021 | Dennis | G06F 9/4881 |
| 10,929,182 B2* | 2/2021 | Sarkar | G06Q 10/08 |
| 10,944,683 B1* | 3/2021 | Roskind | H04L 47/58 |
| 11,328,236 B2* | 5/2022 | Tokuchi | G06F 3/04817 |
| 2007/0010912 A1 | 1/2007 | Feingold et al. | |
| 2008/0066072 A1 | 3/2008 | Yurekli et al. | |
| 2010/0287021 A1 | 11/2010 | Jordan et al. | |
| 2016/0098298 A1 | 4/2016 | Trefler et al. | |
| 2016/0274552 A1 | 9/2016 | Strohmenger et al. | |
| 2017/0060108 A1* | 3/2017 | Kakhandiki | G06N 20/00 |
| 2017/0173784 A1 | 6/2017 | Shah et al. | |
| 2019/0303779 A1 | 10/2019 | Van Briggle et al. | |
| 2020/0004798 A1 | 1/2020 | Weinert, Jr. et al. | |
| 2020/0012994 A1* | 1/2020 | Tokuchi | G06F 3/04847 |
| 2020/0047337 A1* | 2/2020 | Williams | B25J 9/163 |
| 2020/0262650 A1* | 8/2020 | Agarwal | G06Q 10/087 |
| 2021/0191754 A1* | 6/2021 | Evans | G06N 3/08 |

FOREIGN PATENT DOCUMENTS

| | | |
|---|---|---|
| IN | 201811002994 A | 5/2018 |
| KR | 20100075947 A | 7/2010 |

OTHER PUBLICATIONS

Al-Aubidy et al. "Multi-Robot Task Scheduling and Routing Using Neuro-Fuzzy Control", 2015 IEEE, 6 pages.*

(Continued)

*Primary Examiner* — Van H Nguyen
(74) *Attorney, Agent, or Firm* — Volpe Koenig

(57) ABSTRACT

A computing device may execute a robot service that receives process requests to store in a process queue in memory. The robot service may utilize user-defined preferences to prioritize the process requests in the process queue. The process requests may be scheduled based on the user-defined preferences. The robot service may initiate the scheduled process requests for robotic automation of the application.

16 Claims, 7 Drawing Sheets

(56) References Cited

OTHER PUBLICATIONS

Lee et al. "User-centric Real Time Service Scheduling for Robots", 2011 IEEE, pp. 1024-1028.*
Shah et al. "Communication-Efficient Dynamic Task Scheduling for Heterogeneous Multi-Robot Systems", 2007 IEEE, pp. 230-235.*
Zhang, Y. et al. "Multi-Robot Task Scheduling," 2013 IEEE, 7 pages.*
Triggers for assigning time based task. Jun. 27, 2018.
Understanding RPA Scalability—The Blue Prism Example. 2018.
Maymir-Ducharme et al., "Multitasking, Scheduling: Approaches for Ada," Proceedings of the Washington Ada Symposium, pp. 157-162 (Jun. 1990).
Silberschatz et al., "Operating System Concepts—Fourth Edition, PASSAGE," Operating System Concepts, pp. 97-115 (Jan. 1994).

\* cited by examiner

SCHEDULING AND PRIORITIZING RPA JOBS BASED ON USER-DEFINED PRIORITY

BACKGROUND

Robotic process automation (RPA) may automate processes, operations, functions, components, tasks, or workflows on enterprise platforms, virtual machines (VMs), remote desktops, applications on the cloud, desktop applications, mobile applications, or the like by utilizing one or more robots. A software robot, process, package, RPA process, RPA package, RPA robot, a workflow of a package, sub-process, micro-bot, module, or the like may be scheduled locally on a client or user machine for automation of an application. One or more scheduled processes for automation of an application on a local or client machine may interrupt a user or administrator, such as when taking control of a mouse or keyboard.

Moreover, attended robot automation configurations may receive requests for automation of a process from different sources for scheduling or execution that may also cause interruptions. For example, a trigger may detect a change to the file system, a change to a file, a user requested process, or the like and a subsequent process may be scheduled in a short time period resulting in user or operator interruption. It is desirable to schedule a process locally with flexibility and input from a user to prevent interruptions or disruptions.

SUMMARY

A robot service may locally schedule, queue, or execute a process based on user-defined, operator, or administrator preferences or definitions. A notification or reminder for a robot may also be configured based on user-defined, operator, or administrator preferences or definitions. Scheduled processes may be prioritized in a queue using user-defined priorities. In certain configurations, scheduling may be performed by a user locally without additional development, coding, or the like.

BRIEF DESCRIPTION OF THE DRAWING(S)

A more detailed understanding may be had from the following description, given by way of example in conjunction with the accompanying drawings, wherein like reference numerals in the figures indicate like elements, and wherein.

DETAILED DESCRIPTION

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
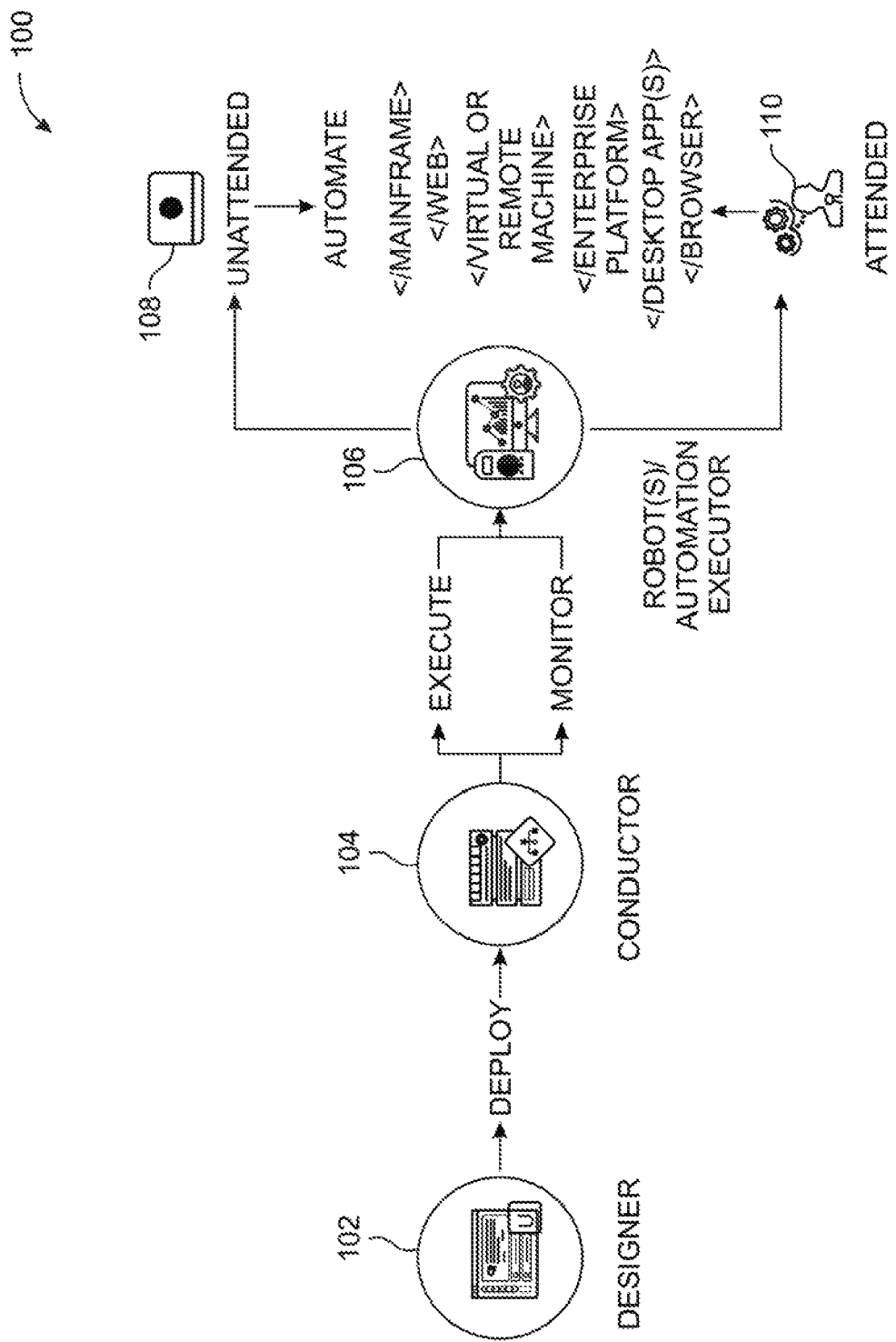
FIG. 1A is an illustration of robotic process automation (RPA) development, design, operation, or execution.

FIG. 1A is an illustration of robotic process automation (RPA) development, design, operation, or execution 100. Designer 102, sometimes referenced as a studio, development platform, development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C#, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
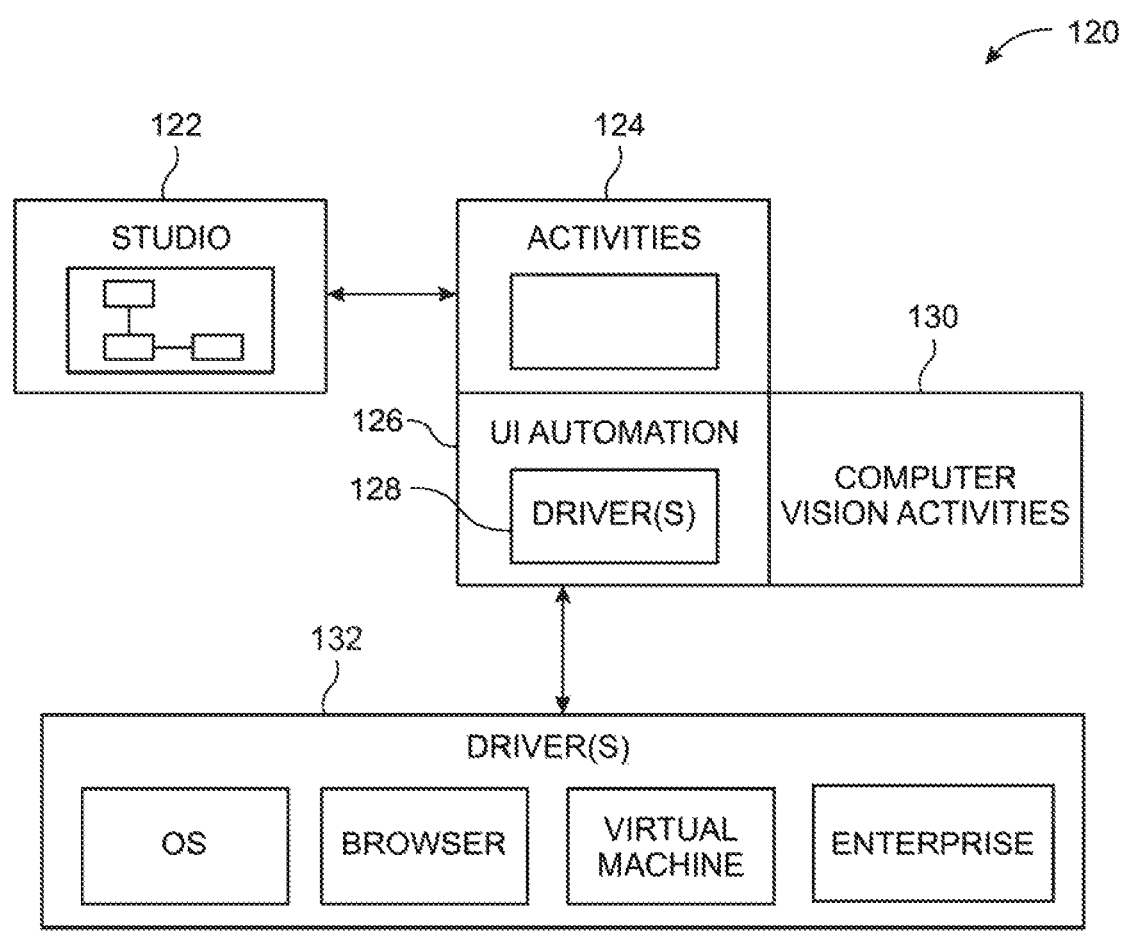
FIG. 1B is another illustration of RPA development, design, operation, or execution.
Figure 1C:
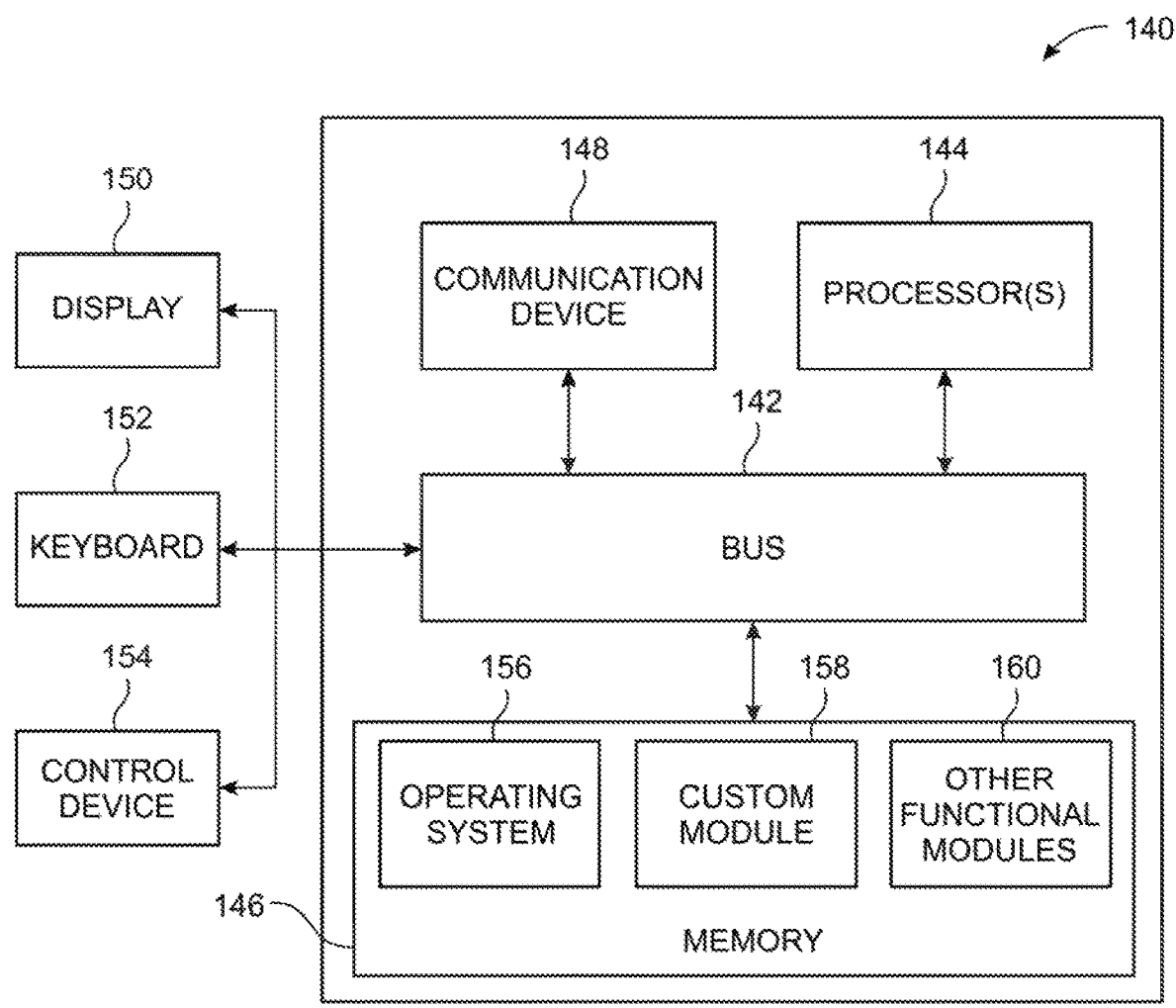
FIG. 1C is an illustration of a computing system or environment.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

FIG. 10 is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

It is desirable to locally schedule, prioritize, or execute a process of a robot based on user, operator, or administrator preferences or definitions. In certain configurations, a process may be scheduled by running an infinite loop that waits for a specific set of criteria or conditions to be present, such as a time-of-day, to perform the process. Processes can also be triggered by windows task scheduler, a third-party system, or the like. In certain configurations, a scheduler may be a reminder given prior to performing a process or triggered process to prevent user interference of a computing device. Without configurations for locally scheduling a process or workflow by a user, notification to the user or detection of user activity may need custom development or coding into a process, workflow, or scheduler. In certain configurations, such scheduling of processes may be performed by a conductor or orchestrator for an attended robot.

In certain embodiments given herein, a computing device may execute a robot service. The robot service may receive one or more process requests to schedule. The one or more process requests may be stored in a process queue. The robot service may utilize a rule or criteria and a user-defined preference to prioritize the one or more process requests in the process queue. Preferences or definitions may be set locally or remotely. Based on the robot service or user input, a robot executor may initiate one of the process requests for robotic automation of an application.

In configurations with a group of workflows related to the same package, an internal queuing component may accept and queue the requests sequentially or substantially sequentially. Local scheduling, including those with user or administrator control, is desirable since requests to run a process from different sources may slow down, freeze, or reduce performance of a computing device or a system. Moreover, a process queue may be configured to inform a software robot, process, package, RPA process, RPA package, RPA robot, a workflow of a package, sub-process, micro-bot, module, or the like on handling multiple and overlapping received requests. With configured logic and a set of rule constructs, a robot may be capable of intelligently assessing one or more processes and guarantee a level of performance, responsiveness, quality, or the like.

Figure 2:
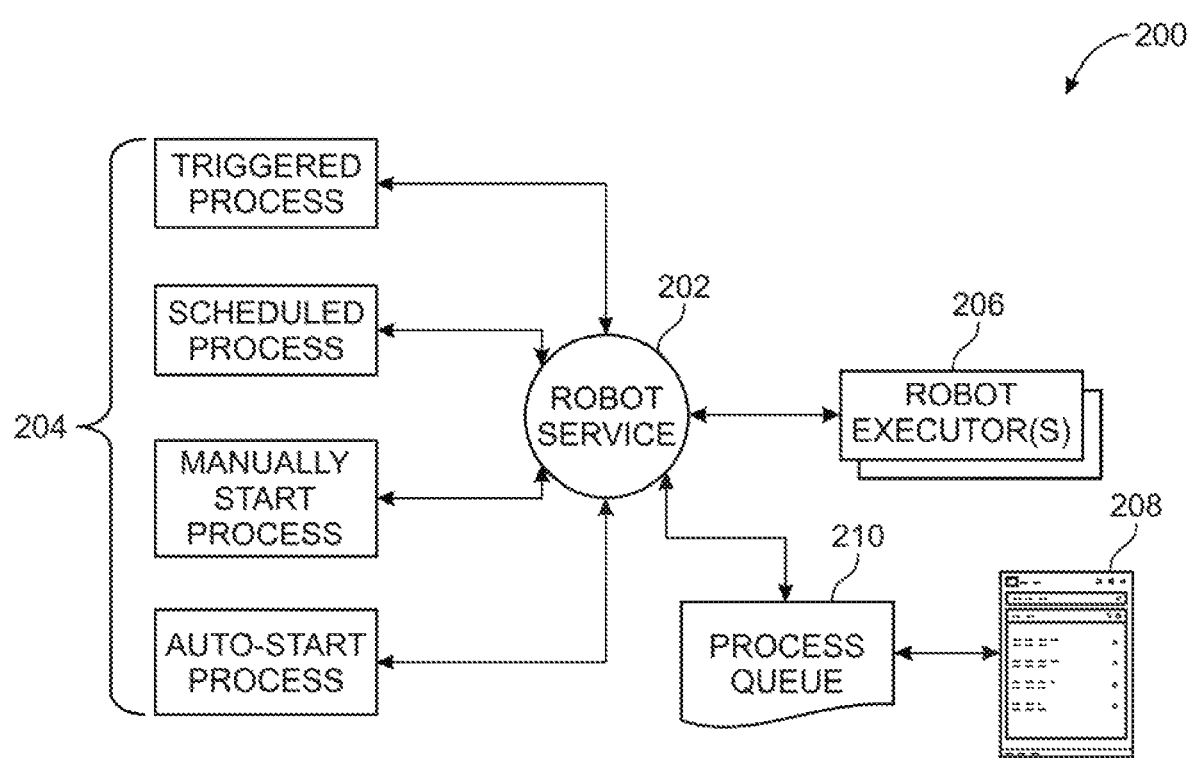
FIG. 2 is an illustration of an example of process queue management for automated robot(s)

FIG. 2 is an illustration of an example for process queue management for a robot(s) in configuration 200. A process queue may be configured locally on a machine or client device for any type of robot, such as an attended robot. A request(s) or process request for robot automation of a process or sub-process may come from one or more different sources. As described herein, a trigger(s) component may detect, such as through monitoring or listening, a change to the file system, a change to a file, a user requested process, or the like and a subsequent process scheduled within a short time period. In configurations with a workflow(s) in a same package(s), an internal or intelligent queuing component may accept and queue a request(s) sequentially. In certain configurations, configurations other than sequential request processing may be utilized when a request(s) for automation comes from one or more different sources.

In configuration 200, for queue management for a robot(s), robot service 202 may use process queue component 210 to start, stop, or pause one or more robot executors 206 based on other processes, sub-processes, or process requests from various sources. When one or multiple-overlapping requests are scheduled, robot service 202 may be configured to manage one or more robot executors 206 to increase performance, resolve conflicts, prioritize requests, or the like. A process may start, stop, or pause based on user, operator, or administrator set preferences or definitions. A notification or reminder used by a robot may also be based on user or administrator preferences or definitions to prompt a user for a start, stop, or pause of a process or sub-process. Preferences or definitions may be set locally or remotely. The user notification or user reminder may be generated based on user-defined or operator preferences. In configuration 200, interface 208 may be configured to display current RPA robot actions, events, or activities of one or more robot executors 206.

A request for one or more services, processes, or workflows may be received from a service or component. A set of rule constructs, criteria, or default condition may be configured so that a robot may assess a process(s) to deliver a performance level, increase responsiveness, manage QoS, or the like. If requests overlap, a rule or criteria may be utilized by robot service 202 to select a request for one or more services, processes, or workflows. Robot service 202 may communicate with and receive requests from various entry point components 204 that include a triggered process component, a scheduled process component, a manually start process component, or an auto-start process component for managing a queue with process queue component 210 to start, initiate, or the like a process or sub-process.

In configuration 200, a robotic process may be associated with a base priority based on the process request source, a time-of-day, a pre-configured value, or the like. In addition, if a process is configured for foreground or background operation, queuing may be skipped and the process may be executed in parallel. As such, configuration 200 provides different mechanisms for a request to start, stop, or pause a process, a robotic process, a service, a robotic service, or the like. In addition, process queue component 210 may coordinate with robot service 202 to ensure that a request is delivered or saved for later processing.

Manual-start process component may, including in substantially real-time, receive command(s) or input(s) from a user to observe process queue component 210 and reprioritize, cancel, or add additional requests. In addition, a high or higher priority process(es) may be configurable to override another foreground or background operation. A user input may also pause a current process so that a high or higher priority process(es) completes with or without using additional resources on a client device, server, or system.

A request from various entry point components 204 is queued, scheduled, or the like in process queue component 210 to initiate or execute by robot service 202 based on user or administrator preferences or definitions. Preferences or definitions may be set locally or remotely. Initiation or execution by robot service 202 may be performed to optimize, minimize, or reduce user interruptions based on preferences or definitions set by a user. For instance, a notification or reminder component may be configured based on user preferences to locally prompt or signal a user or operator that initiation or execution of a scheduled or queued process is forthcoming.

Figure 3:
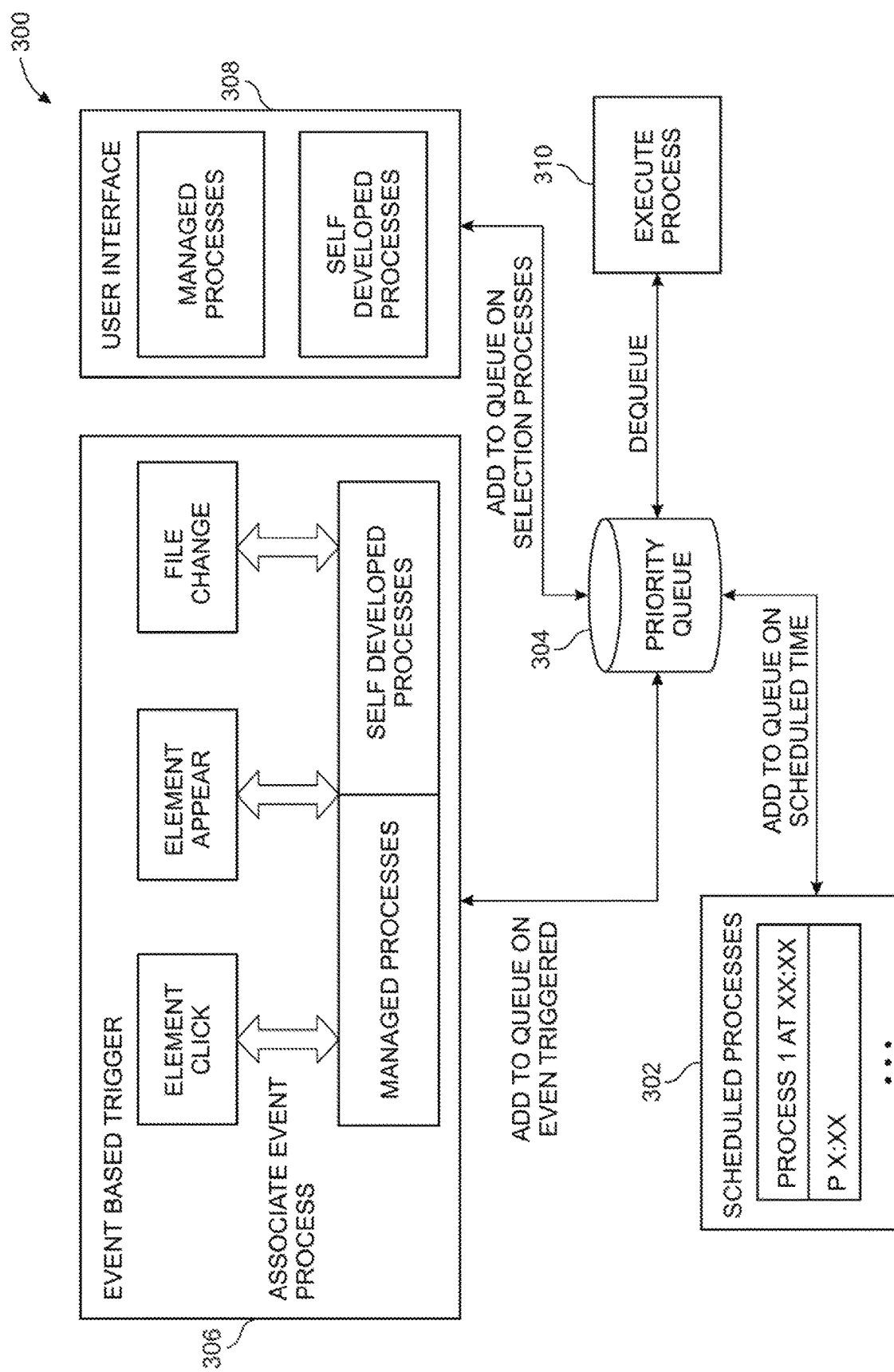
FIG. 3 is an illustration of an example of process queue management for automated robot(s) using user-defined or operator preferences.

FIG. 3 is an illustration of an example of process queue management for automated robot(s) using user-defined or operator preferences 300. Process queue management may be configured such that processes or sub-processes do not disrupt user activity if triggered during user operation of a computing device. As such, process queue management may operate based on user-defined or operator preferences or definitions to prevent disruption. Preferences or definitions may be set locally or remotely.

Moreover, in configuration 300 a user notification or reminder may alert the user that a process will run if not canceled or paused to prevent user or operator interruption or disruption. The user notification or user reminder may be generated based on user-defined or operator preferences. User reminders may be configured as part of a scheduler operation to give notice to a user of a triggered process, prior to execution, to prevent interference to the user using an application. A user notification or reminder may also alert the user that the process can be run if the user is ready. In addition, process queue management may also be configured to prioritize or rearrange overlapping process requests, including utilizing a default configuration. Settings or configurations for process queue management may include the capability for developers or users to prioritize requests. Prioritization of process requests may be configured as first-in, first-out (FIFO), last-in, first-out (LIFO), or the like. One or more process requests may be performed concurrently, simultaneously, or the like by an executor. Furthermore, process requests may be manually reprioritized in a system tray interface by user input. The system tray interface may be part of user interface 308.

Process scheduler 302 may include process 1, process 2, . . . process N. Process scheduler 302 may be configured to locally schedule a process based on a time, condition, event, or the like for execution based on user-defined or operator preferences. A time, event, condition, or the like may be part of user or administrator preferences or definitions. A condition for a process may be a computing device idle mode, a time-of-day, an event pattern, a duration since the last run or execution, or the like. In addition, process 1, process 2, . . . process N may be prioritized based on user-defined priorities. A process of process scheduler 302 may be added, as a request or process request, to priority queue 304 for subsequent execution.

Event based triggering 306 may associate an event to a process or sub-process. An associated event to a process may be part of, as explained herein, a managed process or a self-developed process. An event may be any one of an element click, element appear, file change, or the like. A trigger related to a managed process may be deployed utilizing a pre-existing definition or a configuration file(s) that may allow additional user configurations such as specific folder location, button click, or the like. A self-developed process may be customizable but require development of a new code package. As part of development, a new code package may require testing or re-testing unlike a trigger with a pre-existing definition or a configuration file(s).

A managed process may be a request or process request for event based triggering. Triggering may be performed based on user-defined or operator preferences. For the embodiments given herein, a trigger or trigger event(s) may comprise one or more of a mouse click(s), keyboard event(s), keyboard press(es), image click, touch input(s), screen input(s), on-screen element change, process start, process stop, file change, folder change, universal resource locator (URL) input, navigation input, replay event, undesirable online user navigation, desirable user navigation, external trigger, an event on another system, or the like in relation to an application or user interface. In examples given herein, a robot may be configured to execute a different process(es) when a mouse click(s) is a right click, left click, or the like. Screen element input event(s) may comprise identification of clicking certain element(s) on the interface, such as create record, apply, etc., or monitor of certain element(s) appearing on screen.

User interface 308 may utilize a managed process or a self-developed process for a user to input or select a process to be added, as a request or process request, to priority queue 304. A process inputted or selected may be initiated or executed based on user-defined or operator preferences. Any one of time scheduled, event triggered, or selected processes or sub-processes that are requested may be de-queued for execution by execute process component 310 on a client machine for an automation of an application or user interface. Initiation or execution by execute process component 310 may be performed to optimize, minimize, or reduce user interruptions based on preferences or definitions set by a user or operator. Furthermore, the process or sub-process may be initiated outside of user operation or activity.

Figure 4:
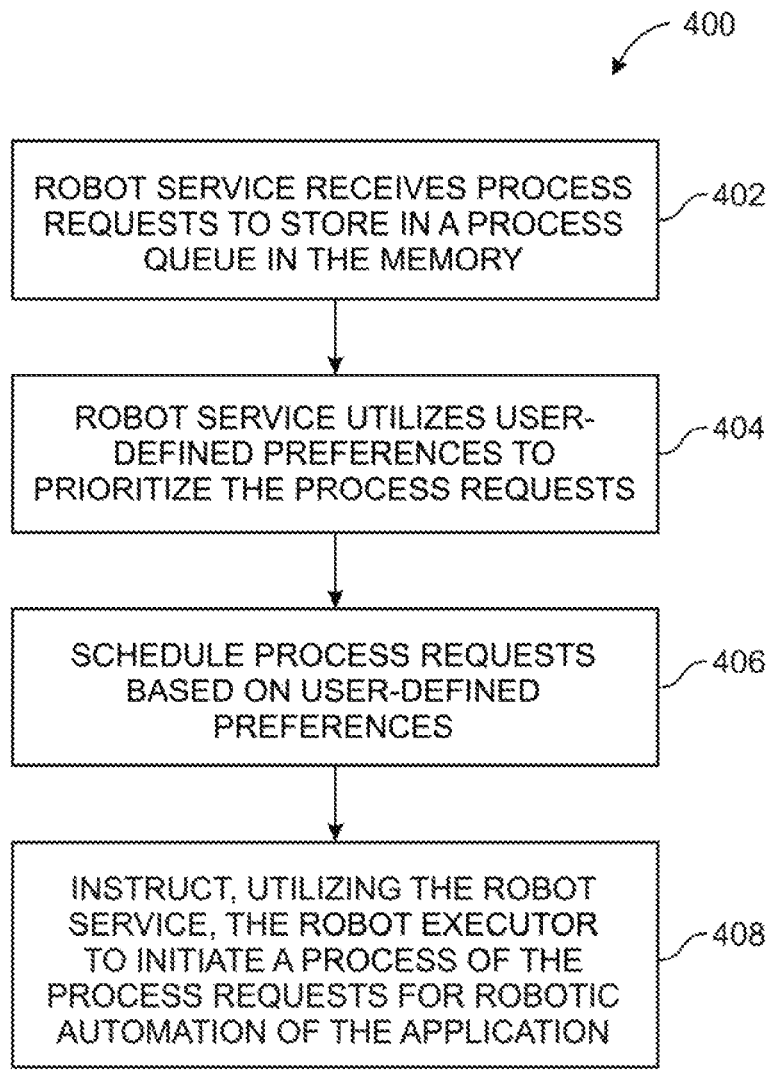
FIG. 4 is an illustration of an example of a process for process queue management using user-defined or operator preferences.

FIG. 4 is an illustration of an example of a process for process queue management using user-defined or operator preferences 400. A robot service component may receive process requests to store in a process queue in memory (402). A robot service may utilize user-defined preferences to prioritize the process requests (404). Process requests may be scheduled based on user-defined preferences (406). A robot executor may be instructed, utilizing the robot service, to initiate a process of the process requests for robotic automation of the application (408).

Figure 5:
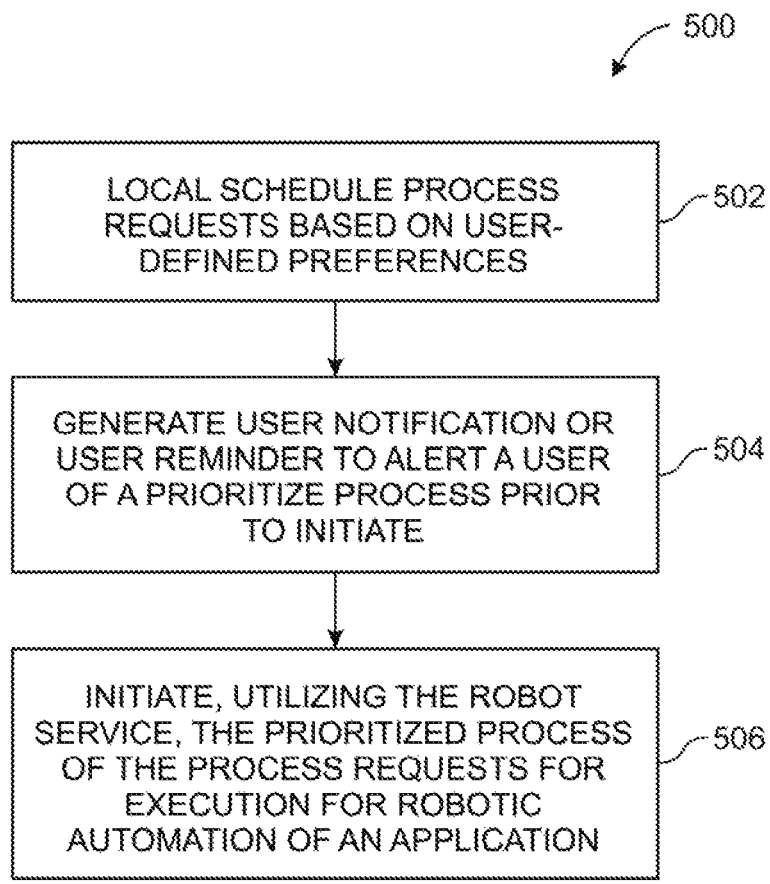
FIG. 5 is an illustration of an example of another process for process queue management using user-defined or operator preferences.

FIG. 5 is an illustration of an example of another process for process queue management using user-defined or operator preferences 500. Process requests may be locally scheduled based on user-defined preferences (502). A user notification or user reminder may be generated to alert a user of a prioritized process prior to initiation (504) to prevent interruption. The user notification or user reminder may be generated based on user-defined or operator preferences. The prioritized process of the process requests may be initiated, utilizing the robot service, for execution for robotic automation of an application (506).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device comprising:
at least one processor and a memory configured to execute a robot service that receives one or more process requests to store in a process queue in the memory, wherein the robot service utilizes user-defined preferences to prioritize the one or more process requests in the process queue, and wherein the one or more process requests are reprioritized by a user input;
the at least one processor configured to schedule the one or more process requests based on the user-defined preferences and to alert the user that one of the one or more processes can be run if the user is ready; and
the at least one processor configured to initiate, using the robot service, the scheduled one or more process requests for robotic automation of an application,
wherein the one or more process requests are received from any one of a triggered process component, a scheduled process component, a manually-start process component, or an auto-start process component, and
wherein the scheduled one or more process requests is initiated on a condition that there is no user operation of the computing device.

2. The computing device of claim 1, wherein the triggered process component includes a trigger event for any one of a change to a file system, a change to a file, or a user requested process.

3. The computing device of claim 1, wherein the scheduled one or more process requests is stopped or paused based on the user-defined preferences.

4. The computing device of claim 1, wherein the at least one processor is further configured to generate a user notification or user reminder to alert a user of the one or more process requests prior to the initiation.

5. The computing device of claim 1, wherein a default configuration is utilized to arrange or prioritize overlapping process requests of the one or more process requests in the process queue.

6. The computing device of claim 1, wherein the one or more process requests are scheduled locally based on a time, a condition, or an event defined by the user-defined preferences.

7. The computing device of claim 1, wherein one of the one or more process requests is an event based trigger for an element click, an element appear, or a file change of the application.

8. The computing device of claim 1, wherein the scheduled one or more process requests is user selected prior to the initiation.

9. A method performed by a computing device, the method comprising:
executing a robot service that receives one or more process requests to store in a process queue in memory, wherein the robot service utilizes user-defined preferences to prioritize the one or more process requests in the process queue, and wherein the one or more process requests are reprioritized by a user input;
scheduling the one or more process requests based on the user-defined preferences and alerting the user that one of the one or more processes can be run if the user is ready; and
initiating, using the robot service, the scheduled one or more process requests for robotic automation of an application,
wherein the one or more process requests are received from any one of a triggered process component, a scheduled process component, a manually-start process component, or an auto-start process component, and
wherein the scheduled one or more process requests is initiated on a condition that there is no user operation of the computing device.

10. The method of claim 9, wherein the triggered process component includes a trigger event for any one of a change to a file system, a change to a file, or a user requested process.

11. The method of claim 9, wherein the scheduled one or more process requests is stopped or paused based on the user-defined preferences.

12. The method of claim 9 further comprising generating a user notification or user reminder to alert a user of the scheduled one or more process requests prior to the initiation.

13. The method of claim 9, wherein a default configuration is utilized to arrange or prioritize overlapping process requests of the one or more process requests in the process queue.

14. The method of claim 9, wherein the one or more process requests are scheduled locally based on a time, a condition, or an event defined by the user-defined preferences.

15. The method of claim 9, wherein one of the one or more process requests is an event based trigger for an element click, an element appear, or a file change of the application.

16. The method of claim 9, wherein the scheduled one or more process requests is user selected prior to the initiation.

* * * * *